(12) United States Patent
Chen (10) Patent No.: US 11,638,892 B2
(45) Date of Patent: May 2, 2023

(54) NANOFIBER AIR FILTER MEDIUM WITH HIGH ADSORPTION PERFORMANCE AND PREPARATION METHOD

(71) Applicant: CHANG-FONG TEXTILE TECHNOLOGY CO., LTD., New Taipei (TW)

(72) Inventor: Jin-Ding Chen, New Taipei (TW)

(73) Assignee: CHANG-FONG TEXTILE TECHNOLOGY CO., LTD., New Taipei (TW)

( * ) Notice: Subject to any disclaimer, the term of this patent is extended or adjusted under 35 U.S.C. 154(b) by 401 days.

(21) Appl. No.: 16/934,014

(22) Filed: Jul. 21, 2020

(65) Prior Publication Data

US 2022/0023783 A1    Jan. 27, 2022

(51) Int. Cl.

| B01D 39/16 | (2006.01) |
| B01D 46/00 | (2022.01) |
| B01D 39/20 | (2006.01) |
| B01D 53/86 | (2006.01) |
| B01D 53/04 | (2006.01) |
| B01D 46/54 | (2006.01) |
| B01J 23/06 | (2006.01) |
| B01J 23/34 | (2006.01) |
| B01J 35/00 | (2006.01) |
| B01J 35/06 | (2006.01) |
| B01J 37/02 | (2006.01) |

(Continued)

(52) U.S. Cl.
CPC ..... *B01D 39/1623* (2013.01); *B01D 39/1615* (2013.01); *B01D 39/2041* (2013.01); *B01D 39/2065* (2013.01); *B01D 46/0001* (2013.01); *B01D 46/0028* (2013.01); *B01D 46/0036* (2013.01); *B01D 46/546* (2013.01); *B01D 53/04* (2013.01); *B01D 53/8671* (2013.01); *B01J 20/048* (2013.01); *B01J 20/18* (2013.01); *B01J 20/20* (2013.01); *B01J 20/28007* (2013.01); *B01J 20/28028* (2013.01); *B01J 20/3007* (2013.01); *B01J 20/3289* (2013.01); *B01J 23/06* (2013.01); *B01J 23/34* (2013.01); *B01J 35/0013* (2013.01); *B01J 35/065* (2013.01); *B01J 37/0228* (2013.01); *B01J 37/0244* (2013.01); *B01J 37/348* (2013.01); *B32B 5/022* (2013.01); *B32B 5/26* (2013.01); *B01D 2239/025* (2013.01); *B01D 2239/0258* (2013.01); *B01D 2239/0407* (2013.01); *B01D 2239/0442* (2013.01); *B01D 2239/0631* (2013.01); *B01D 2239/10* (2013.01); *B01D 2239/1291* (2013.01); *B01D 2253/102* (2013.01); *B01D 2253/108* (2013.01); *B01D 2255/2073* (2013.01); *B01D 2255/20792* (2013.01); *B01D 2255/915* (2013.01); *B01D 2257/708* (2013.01); *B01D 2257/91* (2013.01); *B32B 2250/05* (2013.01); *B32B 2250/20* (2013.01); *B32B 2262/0223* (2013.01); *B32B 2262/0253* (2013.01); *B32B 2262/0261* (2013.01); *B32B 2262/103* (2013.01); *B32B 2262/106* (2013.01)

(58) Field of Classification Search
CPC ............... B01D 39/16; B01D 39/1623; B01D 39/1615; B01D 39/2041; B01D 39/2065; B01D 46/0001; B01D 46/0028; B01D 46/0036; B01D 46/546; B01D 53/04; B01D 53/8671; B01D 2239/025; B01D 2239/0258; B01D 2239/0407; B01D 2239/0442; B01D 2239/0631; B01D 2239/10; B01D 2239/1291; B01D 2253/102; B01D 2253/108; B01D 2255/2073; B01D 2255/20792; B01D 2255/915; B01D 2257/708; B01D 2257/91; B01J 20/048; B01J 20/18; B01J 20/20; B01J 20/28007; B01J 20/28028; B01J 20/3007; B01J 20/3289; B01J 23/06; B01J 23/34; B01J 35/0013; B01J 25/065; B01J 37/0228; B01J 37/0244; B01J 37/348; B32B 5/26; B32B 2250/05; B32B 2250/20; B32B 2262/0223; B32B 2262/0253; B32B 2262/0261; B32B 2262/103; B32B 2262/106
USPC .......................................................... 502/5
See application file for complete search history.

(56) References Cited

U.S. PATENT DOCUMENTS

2020/0087168 A1*  3/2020  Cao ............... B01J 20/2805
2022/0023783 A1*  1/2022  Chen ................... B01J 20/20

* cited by examiner

*Primary Examiner* — Edward M Johnson
(74) *Attorney, Agent, or Firm* — Leong C. Lei (57) ABSTRACT

A high-adsorption-performance nanofiber filter medium includes a support material and a composite nanofiber filtration layer that includes multiple nanometer composite nanofiber layers deposited and stacked on the support material. The nanometer composite nanofiber layer includes first, second, and third nano-powder composite nanofibers, which are uniformly mixed by means of an airflow or are sequentially laminated to form the nanometer composite nanofiber layer. The nanometer composite nanofiber layer formed through sequential lamination includes first, second, and third nanofiber layers. The first nanofiber layer includes multiple first nano-powder composite nanofibers. The second nanofiber layer is stacked on the first nanofiber layer and includes multiple second nano-powder composite nanofibers. The third nanofiber layer is stacked on the second nanofiber layer and includes multiple third nano-powder composite nanofibers. The composite nanofiber filtration layer is formed of multiple nanometer composite nanofiber layers, so that the high-adsorption-performance nanofiber air filter medium shows improved performance.

18 Claims, 1 Drawing Sheet

(51) Int. Cl.
*B01J 37/34* (2006.01)
*B01J 20/20* (2006.01)
*B01J 20/18* (2006.01)
*B01J 20/04* (2006.01)
*B01J 20/28* (2006.01)
*B01J 20/32* (2006.01)
*B01J 20/30* (2006.01)
*B32B 5/02* (2006.01)
*B32B 5/26* (2006.01)

NANOFIBER AIR FILTER MEDIUM WITH HIGH ADSORPTION PERFORMANCE AND PREPARATION METHOD

TECHNICAL FIELD OF THE INVENTION

The present invention relates to a nanofiber air filter medium with high adsorption performance, and more particularly to a nanofiber fiber air filter having function of adsorption and a preparation method thereof.

DESCRIPTION OF THE PRIOR ART

The advance of technology and science makes air pollution and climate change/greenhouse effect trending severer. Volatile organic compounds (VOCs), fine particulate matters (PM2.5), and powdery dirt contained in air significantly affect the living of people and cause a great threat to human body health. The fine particular matter (PM2.5) has a complicated composition and the size may be distributed in a wide range. Fine particulate matters that are smaller than 2 μm could reach deeply into bronchioles and pulmonary alveoli to directly cause significant influence on the lung functionality of human bodies.

VOCs have been a common indoor air pollution source. Particularly, free formaldehyde has a severe health hazard. In addition to extreme discomfort of eyes and respiratory tracts by high concentrations, formaldehyde also causes many diseases, such as respiratory diseases, newborn malformation, and acute psychical depression, or even results in cancers of respiratory tracts, skins, and digestive tracts. Thus, it is an important issue to reduce the amount of formaldehyde contained in air. Nowadays, most of the preventions and controls of PM2.5 focus on outdoor personal protection, and less attention has been paid to purification or cleaning of indoor air. With the upgrading of home living conditions, interior decoration has been widely prevailing. For the purposes of saving energy, the indoor spaces are often kept in an enclosed condition, and this would lead to an increase of concentrations of indoor pollutants. Further, most of the people stay indoors for more than 80% of the time, and apparently, the quality of indoor air is significantly influential on human health.

Known technique for indoor air purification generally include filtration, adsorption, photocatalysis, anions, and vegetation absorption. Filtration is the most directive way of removing VOCs, PM2.5, and powdery dirt from air. However, regular air filter media have low performance and high resistance, making them not suit the needs of people for high quality air. It is desired to develop a high-performance air filter medium that includes a filter substance having high performance and low pressure loss and is effective in removing pollutants such as powdery dirt, formaldehyde, and bacteria from air, and particularly a high efficiency particulate air (HEPA) filter medium.

A HEPA filter medium is filter medium that has a filtration efficiency greater than 99.97% and a pressure loss less than 32 mmH$_2$O when tested with 260 nm particulates at a flow rate of 5.3 cm/sec, and has a filtration efficiency greater than 94% and a pressure loss less than 94 mmH$_2$O when tested at a flow rate of 14 cm/sec. Such a filter medium has been used for air filtration in clean rooms of the semiconductor art or bio-clean rooms. In such environments, an HEPA filter must be used in a stable manner in order to prevent airborne particulates from causing damages on products in the clean rooms or to reduce substances contained in the bio-clean rooms.

The HEPA filters that are currently available in the market generally have a composition of primarily glass fiber or polypropylene based melt-blown nonwoven fabric, and the most commonly used is the glass fiber nonwoven fabric, which is susceptible to break when folded and processed. The polypropylene melt-blown nonwoven fibric, after being subjected to electrostatic treatment, due to being of a less stiff material, must be folded and processed in combination with other base materials. Such filter media are suffering certain constraints. To achieve a certain level of filtration (showing a filtration efficiency greater than 99.97% and a pressure loss less than 32 mmH$_2$O when tested with 260 nm particulates at a flow rate less than 5.3 cm/sec), it comes at a price that the weight of a unit area is greater than 70 g/m$^2$, and often with a very high pressure loss.

Nanofiber filter media, due to having a sparse porous structure and a relatively high specific surface area, is considered most advantageous in performance among all the various filter media. However, it is commonly made of textiles of high polymers and is only effective for intercepting airborne suspending particulates and electrostatic adsorption, and is ineffective in removing bacteria, viruses, and organic contaminants, such as VOCs, from air.

In view of the above, it is desired to provide a novel high adsorption performance nanofiber air filter medium that helps overcome the above problems.

SUMMARY OF THE INVENTION

In view of the above, an objective of the present invention is to provide a high-adsorption-performance nanofiber air filter medium. The high-adsorption-performance nanofiber filter medium comprises a support material and a composite nanofiber filtration layer. The support material comprises nonwoven fabric or paper. The nonwoven fabric comprises melt-blown nonwoven fabric, spunbonded nonwoven fabric, hot-air-bonded nonwoven fabric, or air-laid nonwoven fabric. The composite nanofiber filtration layer is formed of multiple ones of nanometer composite nanofiber layer that are deposited and stacked on a surface of the support material. The nanometer composite nanofiber layers comprise first nano-powder composite nanofiber, second nano-powder composite nanofiber, and third nano-powder composite nanofiber. The adsorptive nanofiber air filter medium has a formaldehyde adsorption efficiency that is greater than 95%, a 0.3 μm powder dust filtration efficiency that is greater than 90% at a 5.3 cm/s flow rate, a pressure loss that is less than 7 mmH$_2$O, and an antimicrobial efficiency that is greater than 99% for *Staphylococcus aureus*.

Another objective of the present invention is to provide a preparation method of a high-adsorption-performance nanofiber air filter medium, wherein the high-adsorption-performance nanofiber filter medium comprises a support material and a composite nanofiber filtration layer. The composite nanofiber filtration layer is formed of multiple ones of nanometer composite nanofiber layer that are deposited and stacked on a surface of the support material. The nanometer composite nanofiber layers comprise first nano-powder composite nanofiber, second nano-powder composite nanofiber, and third nano-powder composite nanofiber. The first nano-powder composite nanofiber, the second nano-powder composite nanofiber, and the third nano-powder composite nanofiber are uniformly mixed by means of an airflow to form the nanometer composite nanofiber layer.

The first nano-powder composite nanofiber is such that high-voltage electrostatic field spinning is applied in combination with airflow stretching to provide the first nano-powder composite nanofiber that has an average fiber fineness between 40 nm-90 nm. The first nano-powder composite nanofiber comprises a first water-soluble polymer and a nano-metal oxide. The nano-metal oxide comprises $TiO_2$, ZnO, or a mixture thereof. The first nano-powder composite nanofiber contains the nano-metal oxide at a ratio of 0.5-5%. The first water-soluble polymer comprises nylon, polyethylene oxide, or polyvinyl alcohol or a mixture thereof.

The second nano-powder composite nanofiber is such that high-voltage electrostatic field spinning is applied to provide the second nano-powder composite nanofiber that has an average fiber fineness between 10 nm-60 nm. The second nano-powder composite nanofiber comprises a second water-soluble polymer and a nano-absorbent. The nano-absorbent comprises activated carbon, zeolite, apatite, or a mixture thereof. A ratio of the nano-absorbent with respect to the second nano-powder composite nanofiber is 0.5-5%. The second water-soluble polymer comprises chitin, chitosan, a chitosan derivative, or a mixture thereof. The chitosan derivative comprises quaternary ammonium chitosan or nano-silver composite chitosan.

The third nano-powder composite nanofiber is such that high-voltage electrostatic field spinning is applied in combination with airflow stretching to provide the third nano-powder composite nanofiber that has an average fiber fineness between 40 nm-90 nm. The third nano-powder composite nanofiber comprises a third water-soluble polymer, a nano-catalyst, and a nano-absorbent. The nano-absorbent comprises activated carbon, zeolite, apatite, or a mixture thereof. The nano-catalyst comprises ZnO, $MnO_2$, or a mixture thereof. A ratio of the nano-catalyst and the nano-absorbent with respect to the third nano-powder composite nanofiber is 0.5- 5%. A ratio of the nano-catalyst with respect to the nano-catalyst and the nano-absorbent is between about 10% and about 50%. The third water-soluble polymer comprises nylon, polyethylene oxide, polyvinyl alcohol, or a mixture thereof.

A further objective of the present invention is to provide a preparation method of a high-adsorption-performance nanofiber air filter medium, wherein the high-adsorption-performance nanofiber filter medium comprises a support material and a composite nanofiber filtration layer. The composite nanofiber filtration layer is formed of multiple ones of nanometer composite nanofiber layer that deposited and stacked on a surface of the support material. The nanometer composite nanofiber layer comprises first nano-powder composite nanofiber, second nano-powder composite nanofiber, and third nano-powder composite nanofiber. The first nano-powder composite nanofiber, the second nano-powder composite nanofiber, and the third nano-powder composite nanofiber are sequentially laminated to form the nanometer composite nanofiber layer. The nanometer composite nanofiber layer so formed through the sequential lamination comprises a first nanofiber layer, a second nanofiber layer, and a third nanofiber layer.

The first nanofiber layer comprises multiple first nano-powder composite nanofibers and is subjected to high-voltage electrostatic field spinning in combination with airflow stretching to provide the first nano-powder composite nanofiber that has an average fiber fineness between 40 nm-90 nm. The first nano-powder composite nanofiber comprises a water-soluble polymer and a nano-metal oxide. The nano-metal oxide comprises $TiO_2$, ZnO, or a mixture thereof. The first nano-powder composite nanofiber contains the nano-metal oxide at a ratio of 0.5-5%. The first water-soluble polymer comprise nylon, polyethylene oxide, polyvinyl alcohol, or a mixture thereof.

The second nanofiber layer is stacked on a surface of the first nanofiber layer. The second nanofiber layer comprises multiple second nano-powder composite nanofibers, and is subjected to high-voltage electrostatic field spinning to provide the second nano-powder composite nanofiber that has an average fiber fineness between 10 nm-60 nm. The second nano-powder composite nanofiber comprises a second water-soluble polymer and a nano-absorbent. The nano-absorbent comprises activated carbon, zeolite, apatite, or a mixture thereof. A ratio of the nano-absorbent with respect to the second nano-powder composite nanofiber is 0.5-5%. The second water-soluble polymer comprises chitin, chitosan, a chitosan derivative, or a mixture thereof. The chitosan derivative comprises quaternary ammonium chitosan or nano-silver composite chitosan.

The third nanofiber layer is stacked on a surface of the second nanofiber layer. The third nanofiber layer comprises multiple third nano-powder composite nanofibers, and is subjected to high-voltage electrostatic field spinning in combination with airflow stretching to provide the third nano-powder composite nanofiber that has an average fiber fineness between 40 nm-90 nm. The third nano-powder composite nanofiber comprises a third water-soluble polymer, a nano-catalyst, and a nano-absorbent. The nano-absorbent comprises activated carbon, zeolite, apatite, or a mixture thereof. The nano-catalyst comprises ZnO, $MnO_2$, or a mixture thereof. A ratio of the nano-catalyst and the nano-absorbent with respect to the third nano-powder composite nanofiber is 0.5-5%. A ratio of the nano-catalyst with respect to the nano-catalyst and the nano-absorbent is between about 10% and about 50%. The third water-soluble polymer comprises nylon, polyethylene oxide, polyvinyl alcohol, or a mixture thereof.

DETAILED DESCRIPTION OF THE PREFERRED EMBODIMENT

Figure 1:
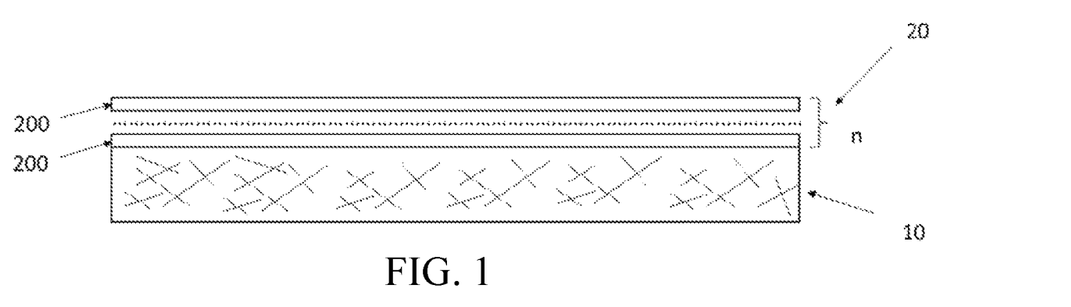
FIG. 1 is a schematic view showing a cross-section of a structure of a high-adsorption-performance nanofiber air filter medium according to a preferred embodiment of the present invention.
Figure 2:
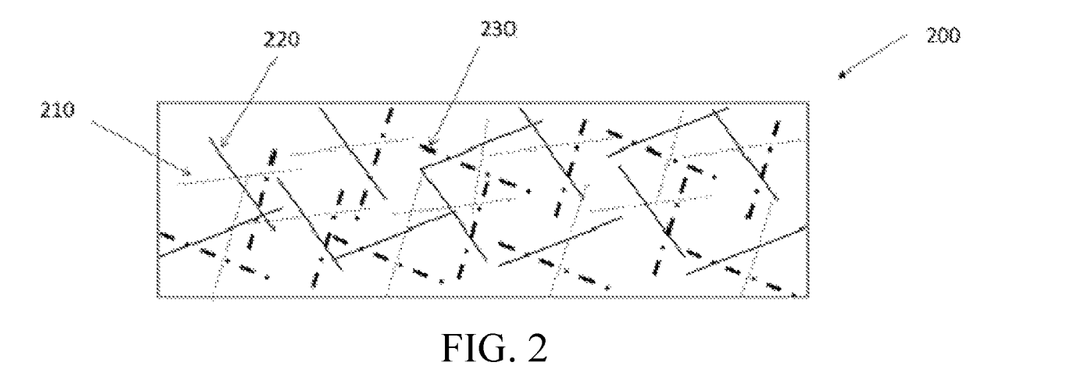
FIG. 2 is a schematic view showing a structure of a nanometer composite nanofiber layer of a high-adsorption-performance nanofiber air filter medium according to a preferred embodiment of the present invention.
Figure 3:
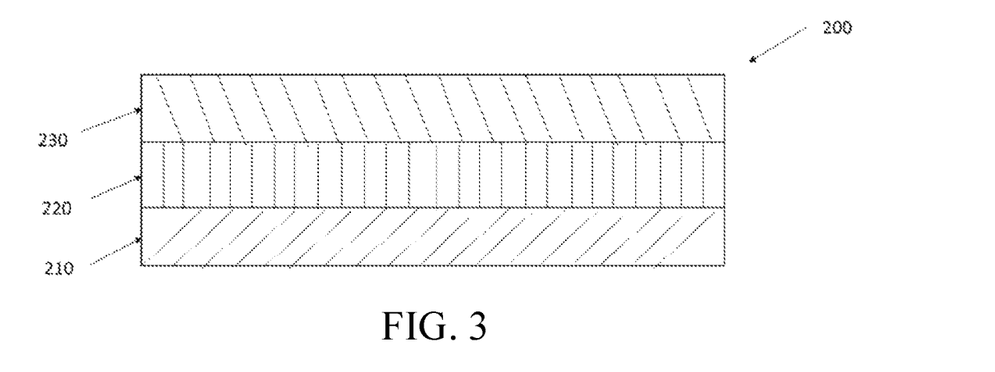
FIG. 3 is a schematic view showing another structure of the nanometer composite nanofiber layer of the high-adsorption-performance nanofiber air filter medium according to the preferred embodiment of the present invention.

Reference is first made to FIG. 1, which is a schematic view showing a cross-section of a structure of a high-adsorption-performance nanofiber air filter medium according to a preferred embodiment of the present invention, FIG. 2, which is a schematic view showing a structure of a nanometer composite nanofiber layer of a high-adsorption-performance nanofiber air filter medium according to a preferred embodiment of the present invention, FIG. 3, which is a schematic view showing another structure of a nanometer composite nanofiber layer of a high-adsorption-performance nanofiber air filter medium according to a preferred embodiment of the present invention, a preferred embodiment of the present invention is illustrated.

As shown in FIG. 1, the high-adsorption-performance nanofiber air filter medium according to the present invention comprises a support material (10) and a composite nanofiber filtration layer (20).

The support material (10) comprises nonwoven fabric or paper. The nonwoven fabric can be melt-blown nonwoven fabric, spunbonded nonwoven fabric, hot-air-bonded nonwoven fabric, or air-laid nonwoven fabric. The support material (10) has a basic weight in the range of 10-30 g/m$^2$, and as examples, the basic weight of the support material (10) can be 10 g/m$^2$, 15 g/m$^2$, 20 g/m$^2$, 25 g/m$^2$, or 30 g/m2.

The composite nanofiber filtration layer (20) is formed by depositing and stacking multiple layers (n) of nanometer composite nanofiber layer (200) on a surface of the support material (10). The multiple layers (n) are in the range of 3-12 layers, and as examples, the multiple layers (n) are 3 layers, 4 layers, 5 layers, 6 layers, 7 layers, 8 layers, 9 layers, 10 layers, 11 layers, or 12 layers. The nanometer composite nanofiber layer (200) comprises 20-50% of first nano-powder composite nanofiber (210), 10-30% of second nano-powder composite nanofiber (220), and 20-50% of third nano-powder composite nanofiber (230). The composite nanofiber filtration layer (20) has basic weight in the range of 0.1-1.5 g/m$^2$, and as examples, the basic weight of the composite nanofiber filtration layer (20) can be 0.1 g/m$^2$, 0.2g/m$^2$, 0.3 g/m$^2$, 0.4 g/m$^2$, 0.5 g/m$^2$, 0.6g/m$^2$, 0.8 g/m$^2$, 1.0 g/m$^2$, 1.2 g/m$^2$, or 1.5 g/m$^2$. The adsorptive nanofiber air filter medium has a formaldehyde adsorption efficiency greater than 95%, a 0.3 μm the powdery dust filtration efficiency greater than 90% at a 5.3 cm/s flow rate, a pressure loss less than 7 mmH$_2$O, and an antimicrobial efficiency greater than 99% for *Staphylococcus aureus*.

In another aspect of the present invention, a preparation method of a high-adsorption-performance nanofiber filter medium is provided, in which the high-adsorption-performance nanofiber filter medium comprises a support material (10) and a composite nanofiber filtration layer (20). The support material (10) comprises nonwoven fabric or paper. The nonwoven fabric can be melt-blown nonwoven fabric, spunbonded nonwoven fabric, hot-air-bonded nonwoven fabric, or air-laid nonwoven fabric. The support material (10) has a basic weight in the range of 10-30 g/m$^2$, and as examples, the basic weight of the support material (10) can be 10 g/m$^2$, 15 g/m$^2$, 20 g/m$^2$, 25 g/m$^2$, or 30 g/m$^2$. The composite nanofiber filtration layer (20) is formed by depositing and stacking multiple layers (n) of nanometer composite nanofiber layer (200) on a surface of the support material (10). The multiple layers (n) are in the range of 3-12 layers, and as examples, the multiple layers (n) are 3 layers, 4 layers, 5 layers, 6 layers, 7 layers, 8 layers, 9 layers, 10 layers, 11 layers, or 12 layers. The nanometer composite nanofiber layer (200) comprises 20-50% of first nano-powder composite nanofiber (210), 10-30% of second nano-powder composite nanofiber (220), and 20-50% of third nano-powder composite nanofiber (230). The composite nanofiber filtration layer (20) has a basic weight in the range of 0.1-1.5 g/m$^2$, and as examples, the basic weight of the composite nanofiber filtration layer (20) can be 0.1 g/m$^2$, 0.2g/m$^2$, 0.3 g/m$^2$, 0.4 g/m$^2$, 0.5 g/m$^2$, 0.6g/m$^2$, 0.8 g/m$^2$, 1.0 g/m$^2$, 1.2 g/m$^2$, or 1.5 g/m$^2$. The first nano-powder composite nanofiber (210), the second nano-powder composite nanofiber (220), and the third nano-powder composite nanofiber (230) are uniformly mixed by means of an airflow.

The first nano-powder composite nanofiber (210) is such that high-voltage electrostatic field spinning is applied in combination with airflow stretching to provide the first nano-powder composite nanofiber (210) that has an average fiber fineness between 40 nm-90 nm, and as examples, the average fiber fineness of the first nano-powder composite nanofiber (210) can be 30 nm, 50 nm, 60 nm, 70 nm, 80 nm, or 90 nm. The first nano-powder composite nanofiber (210) comprises a first water-soluble polymer and a nano-metal oxide. The nano-metal oxide can be TiO$_2$, ZnO, or a mixture thereof. The first nano-powder composite nanofiber (210) contains the nano-metal oxide at a ratio of 0.5-5%, and as examples, the ratio of the nano-metal oxide contained in the first nano-powder composite nanofiber (210) can be 0.5%, 1%, 2%, 3%, 4%, or 5%. The first water-soluble polymer can be nylon, polyethylene oxide, polyvinyl alcohol, or a mixture thereof.

The second nano-powder composite nanofiber (220) is such that high-voltage electrostatic field spinning is applied to provide the second nano-powder composite nanofiber (220) that has an average fiber fineness between 10 nm-60 nm, and as examples, the average fiber fineness of the second nano-powder composite nanofiber (220) can be 10 nm, 20 nm, 30 nm, 40 nm, 50 nm, or 60 nm. The second nano-powder composite nanofiber (220) comprises a second water-soluble polymer and a nano-absorbent. The nano-absorbent can be activated carbon, zeolite, apatite, or a mixture thereof. A ratio of the nano-absorbent with respect to the second nano-powder composite nanofiber is 0.5-5%, and as examples, the ratio of the nano-absorbent with respect to the second nano-powder composite nanofiber (220) can be 0.5%, 1%, 2%, 3%, 4%, or 5%. The second water-soluble polymer can be chitin, chitosan, a chitosan derivative, or a mixture thereof. The chitosan derivative can be quaternary ammonium chitosan or nano-silver composite chitosan.

The third nano-powder composite nanofiber (230) is such that high-voltage electrostatic field spinning is applied in combination with airflow stretching to provide the third nano-powder composite nanofiber (230) that has an average fiber fineness between 40 nm-90 nm, and as examples, the average fiber fineness of the third nano-powder composite nanofiber (230) can be 40 nm, 50 nm, 60 nm, 70 nm, 80 nm, or 90 nm. The third nano-powder composite nanofiber (230) comprises a third water-soluble polymer, a nano-catalyst, and a nano-absorbent. The nano-absorbent can be activated carbon, zeolite, apatite, or a mixture thereof. The nano-catalyst can be ZnO, MnO$_2$, or a mixture thereof. A ratio of the nano-catalyst and the nano-absorbent with respect to the third nano-powder composite nanofiber (230) is 0.5-5%, and as examples, the ratio of the nano-catalyst and the nano-absorbent with respect to the third nano-powder composite nanofiber (230) can be 0.5%, 1%, 2%, 3%, 4%, or 5%. A ratio of the nano-catalyst with respect to the nano-catalyst and the nano-absorbent is between approximately 10% and approximately 50%, and as examples, the ratio of the nano-catalyst with respect to the nano-absorbent can be 10%, 20%, 30%, 40%, or 50%. The third water-soluble polymer can be nylon, polyethylene oxide, polyvinyl alcohol, or a mixture thereof.

In a further aspect of the present invention, a preparation method of a high-adsorption-performance nanofiber air filter medium is provided, in which the high-adsorption-performance nanofiber filter medium comprises a support material (10) and a composite nanofiber filtration layer (20). The support material (10) comprises nonwoven fabric or paper. The nonwoven fabric can be melt-blown nonwoven fabric, spunbonded nonwoven fabric, hot-air-bonded nonwoven fabric, or air-laid nonwoven fabric. The support material (10) has a basic weight in the range of 10-30 g/m$^2$, and as examples, the basic weight of the support material (10) can be 10 g/m$^2$, 15 g/m$^2$, 20 g/m$^2$, 25 g/m$^2$, or 30 g/m$^2$. The composite nanofiber filtration layer (20) is formed by depositing and stacking multiple layers (n) of nanometer composite nanofiber layer (200) on a surface of the support material (10). The multiple layers (n) are in the range of 3-12 layers, and as examples, the multiple layers (n) are 3 layers, 4 layers, 5 layers, 6 layers, 7 layers, 8 layers, 9 layers, 10 layers, 11 layers, or 12 layers.

The nanometer composite nanofiber layer (200) comprises 20-50% of first nano-powder composite nanofiber (210), 10-30% of second nano-powder composite nanofiber (220), and 20-50% of third nano-powder composite nanofiber (230). The composite nanofiber filtration layer (20) has a basic weight in the range of 0.1-1.5 g/m$^2$, and as examples, the basic weight of the composite nanofiber filtration layer (20) can be 0.1 g/m$^2$, 0.2g/m$^2$, 0.3 g/m$^2$, 0.4 g/m$^2$, 0.5 g/m$^2$, 0.6g/m$^2$, 0.8 g/m$^2$, 1.0 g/m$^2$, 1.2 g/m$^2$, or 1.5 g/m$^2$. The first nano-powder composite nanofiber (210), the second nano-powder composite nanofiber (220), and the third nano-powder composite nanofiber (230) are sequentially laminated to form the nanometer composite nanofiber layer (200). The nanometer composite nanofiber layer (200) formed through sequential lamination comprises a first nanofiber layer, a second nanofiber layer, and a third nanofiber layer.

The first nanofiber layer is stacked on the surface of the support material (10), and the first nanofiber layer comprises multiple first nano-powder composite nanofibers (210), which are such that high-voltage electrostatic field spinning is applied in combination with airflow stretching to provide the first nano-powder composite nanofibers (210) that have an average fiber fineness between 40 nm-90 nm, and as examples, the average fiber fineness of the first nano-powder composite nanofibers (210) can be 40 nm, 50 nm, 60 nm, 70 nm, 80 nm, or 90 nm. The first nano-powder composite nanofibers (210) comprise a first water-soluble polymer and a nano-metal oxide. The nano-metal oxide can be TiO2, ZnO, or a mixture thereof. The first nano-powder composite nanofibers (210) comprise the nano-metal oxide at a ratio of 0.5-5%, and as examples, the ratio of the nano-metal oxide contained in the first nano-powder composite nanofibers (210) can be 0.5%, 1%, 2%, 3%, 4%, or 5%. The first water-soluble polymer can be nylon, polyethylene oxide, polyvinyl alcohol, or a mixture thereof.

The second nanofiber layer is stacked on a surface of the first nanofiber layer, and the second nanofiber layer comprises multiple second nano-powder composite nanofibers (220), which are such that high-voltage electrostatic field spinning is applied to provide the second nano-powder composite nanofibers (220) that have an average fiber fineness between 10 nm-60 nm, and as examples, the average fiber fineness of the second nano-powder composite nanofibers (220) can be 10 nm, 20 nm, 30 nm, 40 nm, 50 nm, or 60 nm. The second nano-powder composite nanofibers (220) comprise a second water-soluble polymer and a nano-absorbent. The nano-absorbent can be activated carbon, zeolite, apatite, or a mixture thereof. A ratio of the nano-absorbent with respect to the second nano-powder composite nanofiber is 0.5-5%, and as examples, the ratio of the nano-absorbent with respect to the second nano-powder composite nanofiber (220) can be 0.5%, 1%, 2%, 3%, 4%, or 5%. The second water-soluble polymer can be chitin, chitosan, a chitosan derivative, or a mixture thereof. The chitosan derivative can be quaternary ammonium chitosan or nano-silver composite chitosan.

The third nanofiber layer is stacked on a surface of the second nanofiber layer, and the third nanofiber layer comprises multiple third nano-powder composite nanofibers (230), which are such that high-voltage electrostatic field spinning is applied in combination with airflow stretching to provide the third nano-powder composite nanofibers (230) that have an average fiber fineness between 40 nm-90 nm, and as examples, the average fiber fineness of the third nano-powder composite nanofibers (230) can be 40 nm, 50 nm, 60 nm, 70 nm, 80 nm, or 90 nm. The third nano-powder composite nanofibers (230) comprise a third water-soluble polymer, a nano-catalyst, and a nano-absorbent. The nano-absorbent can be activated carbon, zeolite, apatite, or a mixture thereof. The nano-catalyst can be ZnO, MnO$_2$, or a mixture thereof. A ratio of the nano-catalyst and the nano-absorbent with respect to the third nano-powder composite nanofiber (230) is 0.5-5%, and as examples, the ratio of the nano-catalyst and the nano-absorbent with respect to the third nano-powder composite nanofiber (230) can be 0.5%, 1%, 2%, 3%, 4%, or 5%. A ratio of the nano-catalyst with respect to the nano-catalyst and the nano-absorbent is between approximately 10% and approximately 50%, and as examples, the ratio of the nano-catalyst with respect to the nano-absorbent can be 10%, 20%, 30%, 40%, or 50%. The third water-soluble polymer can be nylon, polyethylene oxide, polyvinyl alcohol, or a mixture thereof.

The composite nanofiber filtration layer (20) according to the present invention is formed by depositing multiple (n) layers of nanometer composite nanofiber layer (200) to provide a high-adsorption-performance nanofiber air filter medium, which, as compared with the prior art, exhibits high VOC adsorption performance, high powder dust filtration efficiency, low pressure loss, and antimicrobial performance.

Formaldehyde Adsorption Efficiency Test:

The formaldehyde adsorption efficiency carried out according to deodorization performance evaluation method provided by Japan Textile Evaluation Technology Council (JAFET).

Antimicrobial Efficiency Test:

Antimicrobial or bacterium suppression efficiency is tested according to AATCC 100 for test of antimicrobial efficiency against *Staphylococcus aureus*.

For better illustration and understanding of the purposes, structure technical means, and efficacy of the present invention, a detailed description concerning example, reference being had to the attached drawings, will be provided below:

EXAMPLE 1

Nylon of 65 g and nano-zinc oxide (ZnO) of 10 g are dissolved in formic acid of 425 g to make a first nano-powder composite nanofiber spinning liquid that includes 13% of nylon and 2% of ZnO; chitosan of 30 g and activated carbon powder of 10 g (the activated carbon powder being first dissolved in 30-90% acetic acid and pulverized with a ball grinder to a size of 20 nm) are dissolved in 30-90% acetic acid of 460 g to make a second nano-powder composite nanofiber spinning liquid that includes 6% of chitosan and 2% of activated carbon powder; nylon of 65 g, nano-zinc oxide (ZnO) of 5 g, and activated carbon powder of 5 g (the activated carbon powder being first dissolved in formic acid and pulverized with a ball grinder to a size of 20 nm) dissolved in formic acid of 425 g to make a third nano-powder composite nanofiber spinning liquid that includes 13% of nylon, 1% of ZnO, and 1% of activated carbon powder. The first nano-powder composite nanofiber spinning liquid is subjected to a 45KV electrostatic voltage, spinning liquid at 8 c.c/min, and 2 kg/cm$^2$ airflow stretching; the second nano-powder composite nanofiber spinning liquid is subjected to a 45KV electrostatic voltage, and spinning liquid at 8 c c/min; the third nano-powder composite nanofiber spinning liquid is subjected to 45KV electrostatic voltage, spinning liquid at 8 c.c/min, and 2 kg/cm$^2$ airflow stretching. The first nano-powder composite nanofiber, the second nano-powder composite nanofiber, and the third nano-powder composite nanofiber are uniformly mixed by means of an airflow to form the nanometer composite nanofiber layer. The nanometer composite nanofiber layer comprises 40% of the first nano-powder composite nanofiber, 20% of the second nano-powder composite nanofiber, and 40% of the third nano-powder composite nanofiber. Ten (10) layers of the nanometer composite nanofiber layer are deposited on 10 g/m$^2$ PP spunbonded nonwoven fabric to form a 0.7 g/m$^2$ composite nanofiber filtration layer, the first nano-powder composite nanofiber having an average diameter of 60 nm, the second nano-powder composite nanofiber having an average diameter of 53 nm, the third nano-powder composite nanofiber having an average diameter of 70 nm, the formaldehyde adsorption efficiency, 0.3 μm powdery dust filtration efficiency at a 5.3 cm/s flow rate, a pressure loss, and *Staphylococcus aureus* antimicrobial efficiency being listed in Table 1.

EXAMPLE 2

Nylon of 65 g and nano-zinc oxide (ZnO) of 10 g are dissolved in formic acid of 425 g to make a first nano-powder composite nanofiber spinning liquid that includes 13% of nylon and 2% of ZnO; chitosan of 30 g and activated carbon powder of 10 g (the activated carbon powder being first dissolved in 30-90% acetic acid and pulverized with a ball grinder to a size of 20 nm) are dissolved in 30-90% acetic acid of 460 g to make a second nano-powder composite nanofiber spinning liquid that includes 6% of chitosan and 2% of activated carbon powder; nylon of 65 g, nano-zinc oxide (ZnO) of 5 g, and activated carbon powder of 5 g (the activated carbon powder being first dissolved in formic acid and pulverized with a ball grinder to a size of 20 nm) dissolved in formic acid of 425 g to make a third nano-powder composite nanofiber spinning liquid that includes 13% of nylon, 1% of ZnO, and 1% of activated carbon powder. The first nano-powder composite nanofiber spinning liquid is subjected to a 45KV electrostatic voltage, spinning liquid at 8 c.c/min, and 2 kg/cm$^2$ airflow stretching; the second nano-powder composite nanofiber spinning liquid is subjected to a 45KV electrostatic voltage, and spinning liquid at 8 c c/min; the third nano-powder composite nanofiber spinning liquid is subjected to 45KV electrostatic voltage, spinning liquid at 8 c.c/min, and 2 kg/cm$^2$ airflow stretching. The first nano-powder composite nanofiber, the second nano-powder composite nanofiber, and the third nano-powder composite nanofiber are sequentially laminated to form the nanometer composite nanofiber layer. The nanometer composite nanofiber layer comprises 40% of the first nano-powder composite nanofiber, 20% of the second nano-powder composite nanofiber, and 40% of the third nano-powder composite nanofiber. The nanometer composite nanofiber layer is formed on the support material that includes 10 g/m$^2$ PP spunbonded nonwoven fabric and ten (10) layers of the nanometer composite nanofiber layer are deposited to form a 0.7 g/m$^2$ composite nanofiber filtration layer, the first nano-powder composite nanofiber having an average diameter of 60 nm, the second nano-powder composite nanofiber having an average diameter of 53 nm, the third nano-powder composite nanofiber having an average diameter of 70 nm, the composite nanofiber filtration layer having formaldehyde adsorption efficiency, 0.3 μm powdery dust filtration efficiency at a 5.3 cm/s flow rate, pressure loss, and *Staphylococcus aureus* antimicrobial efficiency that are listed in Table 1.

EXAMPLE 3

Polyvinyl alcohol of 65 g and nano-manganese dioxide (MnO$_2$) of 10 g are dissolved in water of 425 g to make a first nano-powder composite nanofiber spinning liquid that includes 13% of polyvinyl alcohol and 2% of MnO$_2$; chitosan of 30 g and zeolite powder of 10 g (the zeolite powder being first dissolved in 30-90% acetic acid and pulverized with a ball grinder to a size of 20 nm) are dissolved in 30-90% acetic acid of 460 g to make a second nano-powder composite nanofiber spinning liquid that includes 6% of chitosan and 2% of zeolite powder; nylon of 65 g, nano-zinc oxide (ZnO) of 5 g, and zeolite powder of 5 g (the zeolite powder being dissolved in formic acid and pulverized with a ball grinder to a size of 20 nm) dissolved in formic acid of 425 g to make a third nano-powder composite nanofiber spinning liquid that includes 13% of nylon, 1% of ZnO, and 1% of zeolite powder. The first nano-powder composite nanofiber spinning liquid is subjected to a 45KV electrostatic voltage, spinning liquid at 8 c.c/min, and 2 kg/cm$^2$ airflow stretching; the second nano-powder composite nanofiber spinning liquid is subjected to a 45KV electrostatic voltage, and spinning liquid at 8 c c/min; the third nano-powder composite nanofiber spinning liquid is subjected to 45KV electrostatic voltage, spinning liquid at 8 c.c/min, and 2 kg/cm$^2$ airflow stretching. The first nano-powder composite nanofiber, the second nano-powder composite nanofiber, and the third nano-powder composite nanofiber are sequentially laminated to form the nanometer composite nanofiber layer. The nanometer composite nanofiber layer comprises 40% of the first nano-powder composite nanofiber, 20% of the second nano-powder composite nanofiber, and 40% of the third nano-powder composite nanofiber. The nanometer composite nanofiber layer is formed on the support material that includes 15 g/m$^2$ PP melt-blown nonwoven fabric, and six (6) layers of the nanometer composite nanofiber layer are deposited to form a 0.3 g/m$^2$ composite nanofiber filtration layer, the first nano-powder composite nanofiber having an average diameter of 70 nm, the second nano-powder composite nanofiber having an average diameter of 60 nm, the third nano-powder composite nanofiber having an average diameter of 72 nm, the composite nanofiber filtration layer having formaldehyde adsorption efficiency, 0.3 μm powdery dust filtration efficiency at a 5.3 cm/s flow rate, pressure loss, and *Staphylococcus aureus* antimicrobial efficiency that are listed in Table 1.

EXAMPLE 4

Polyethylene oxide of 20 g and nano-zinc oxide (ZnO) of 5 g are dissolved in water of 475 g to make a first nano-powder composite nanofiber spinning liquid that includes 4% of polyethylene oxide and 1% of ZnO; chitin of 30 and apatite powder of 10 g (the apatite powder being first dissolved in 30-90% acetic acid and pulverized with a ball grinder to a size of 20 nm) are dissolved in 30-90% acetic acid of 460 g to make a second nano-powder composite nanofiber spinning liquid that includes 6% of chitin and 2% of apatite powder; polyvinyl alcohol of 65 g and nano-manganese dioxide (MnO$_2$) of 2.5 g and activated carbon powder of 5 (the activated carbon powder being first dissolved in water and pulverized with a ball grinder to a size of 20 nm) are dissolved in water of 427.5 g to make a third nano-powder composite nanofiber spinning liquid that includes 13% of polyvinyl alcohol, 0.5% of ZnO, and 1% of zeolite powder. The first nano-powder composite nanofiber spinning liquid is subjected to a 45KV electrostatic voltage, spinning liquid at 6 c.c/min, and 2 kg/cm² airflow stretching; the second nano-powder composite nanofiber the liquid is subjected to a 45KV electrostatic voltage, and spinning liquid at 8 c c/min; the third nano-powder composite nanofiber spinning liquid is subjected to a 45KV electrostatic voltage, spinning liquid at 8 c.c/min, and 2 kg/cm² airflow stretching. The first nano-powder composite nanofiber, the second nano-powder composite nanofiber, and the third nano-powder composite nanofiber are sequentially laminated to form the nanometer composite nanofiber layer. The nanometer composite nanofiber layer comprises 20% of the first nano-powder composite nanofiber, 30% of the second nano-powder composite nanofiber, and 50% of the third nano-powder composite nanofiber. The nanometer composite nanofiber layer is formed on the support material that includes 25 g/m² PP spunbonded nonwoven fabric and eight (8) layers of the nanometer composite nanofiber layer are deposited to form a 0.5 g/m² composite nanofiber filtration layer, the first nano-powder composite nanofiber having an average diameter of 66 nm, the second nano-powder composite nanofiber having an average diameter of 54 nm, the third nano-powder composite nanofiber having an average diameter of 68 nm, the composite nanofiber filtration layer having formaldehyde adsorption efficiency, 0.3 μm powdery dust filtration efficiency at a 5.3 cm/s flow rate, pressure loss, and *Staphylococcus aureus* antimicrobial efficiency that are listed in Table 1.

EXAMPLE 5

Nylon of 65 g and nano-zinc oxide (ZnO) of 10 g are dissolved in formic acid of 425 g to make a first nano-powder composite nanofiber spinning liquid that includes 13% of nylon and 2% of ZnO; quaternary ammonium chitosan of 30 and activated carbon powder of 10 g (the activated carbon powder being first dissolved in 30-90% acetic acid and pulverized with a ball grinder to a size of 20 nm) are dissolved in 30-90% acetic acid of 460 g to make a second nano-powder composite nanofiber spinning liquid that includes 6% of quaternary ammonium chitosan and 2% of zeolite powder; polyethylene oxide of 20 g and nano-zinc oxide (ZnO) of 2.5 g and apatite powder of 5 (the apatite powder being first dissolved in water and pulverized with a ball grinder pulverized to a size of 20 nm) are dissolved in water of 472.5 g to make a third nano-powder composite nanofiber spinning liquid that includes 4% of polyethylene oxide, 0.5% of ZnO, and 1% of apatite powder. The first nano-powder composite nanofiber spinning liquid is subjected to a 45KV electrostatic voltage, spinning liquid at 6 c c/min ,and 2 kg/cm² airflow stretching; the second nano-powder composite nanofiber spinning liquid is subjected to a 45KV electrostatic voltage, and spinning liquid at 8 c.c/min; the third nano-powder composite nanofiber spinning liquid is subjected to a 45KV electrostatic voltage, spinning liquid at 8 c.c/min, and 2 kg/cm² airflow stretching. The first nano-powder composite nanofiber, the second nano-powder composite nanofiber, and the third nano-powder composite nanofiber are sequentially laminated to form the nanometer composite nanofiber layer. The nanometer composite nanofiber layer comprises 50% of the first nano-powder composite nanofiber, 30% of the second nano-powder composite nanofiber, and 20% of the third nano-powder composite nanofiber. The nanometer composite nanofiber layer is formed on the support material that includes 15 g/m² PP melt-blown nonwoven fabric, and eight (8) layers of the nanometer composite nanofiber layer are deposited to form a 0.4 g/m² composite nanofiber filtration layer, the first nano-powder composite nanofiber having an average diameter of 68 nm, the second nano-powder composite nanofiber having an average diameter of 56 nm, the third nano-powder composite nanofiber having an average diameter of 70 nm, the composite nanofiber filtration layer having formaldehyde adsorption efficiency, 0.3 μm powdery dust filtration efficiency at a 5.3 cm/s flow rate, pressure loss, and *Staphylococcus aureus* antimicrobial efficiency that are listed in Table 1.

COMPARATIVE EXAMPLE 1

Nylon of 65 g is dissolved in 435 g formic acid to make a spinning liquid that comprises 13% of nylon nanofiber. The nylon nanofiber spinning liquid is subjected to a 45KV electrostatic voltage, and spinning liquid at 8 c.c/min, and a 0.6 g/m² nanofiber filtration layer is formed through deposition on 15 g/m² PP spunbonded nonwoven fabric. The nylon nanofiber has an average diameter of 95 nm, and shows formaldehyde adsorption efficiency, 0.3 μm powdery dust filtration efficiency at a 5.3 cm/s flow rate, pressure loss, and *Staphylococcus aureus* antimicrobial efficiency that are listed in Table 1.

COMPARATIVE EXAMPLE 2

Polyvinyl alcohol of 65 g is dissolved in formic acid of 435 g to make a spinning liquid that comprises 13% of polyvinyl alcohol nanofiber. The polyvinyl alcohol nanofiber spinning liquid is subjected to a 45KV electrostatic voltage, and spinning liquid at 8 c.c/min, and a 0.6 g/m² nanofiber filtration layer is formed through deposition on 15 g/m² PP melt-blown nonwoven fabric. The polyvinyl alcohol nanofiber has an average diameter of 106 nm, and shows formaldehyde adsorption efficiency, 0.3 μm powdery dust filtration efficiency at a 5.3 cm/s flow rate, pressure loss, and *Staphylococcus aureus* antimicrobial efficiency that are listed in Table 1.

TABLE 1

| Examples | 0.3 μm dust at 5.3 cm/s | | Formaldehyde Adsorption Efficiency | *Staphylococcus Aureus* Antimicrobial Efficiency |
| | Filtration Efficiency | Pressure Loss (mmH$_2$O) | | |
| --- | --- | --- | --- | --- |
| Example 1 | 93 | 4.5 | 95.8 | 99.1 |
| Example 2 | 98 | 6.2 | 98.4 | 99.9 |
| Example 3 | 92 | 3.2 | 95.5 | 99.3 |
| Example 4 | 91 | 2.38 | 96.7 | 99.4 |
| Example 5 | 92 | 3 | 95.2 | 99.2 |
| Com. Ex. 1 | 70 | 1.5 | 10 | 0 |
| Com. Ex. 2 | 85 | 2.4 | 20 | 0 |

It can be seen from Example 1, Example 2, Example 3, Example 4, and Example 5, and also Comparative Example 1 and Comparative Example 2 that, as shown in Table 1, the high-adsorption-performance nanofiber air filter medium according to the present invention has bettered adsorption performance, and the high-adsorption-performance nanofiber air filter medium and the preparation method thereof according to the present invention provide excellent industrial utilization and improvement.

I claim:

1. A high-adsorption-performance nanofiber air filter medium, comprising:
   a support material; and
   a composite nanofiber filtration layer, which comprises multiple layers of nanometer composite nanofiber layer that are deposited and stacked on a surface of the support material, the nanometer composite nanofiber layer comprising first nano-powder composite nanofiber, second nano-powder composite nanofiber, and third nano-powder composite nanofiber;
   wherein the first nano-powder composite nanofiber, the second nano-powder composite nanofiber, and the third nano-powder composite nanofiber are formed by uniformly mixing together with airflow or sequentially laminating respectively,
   wherein the high-adsorption-performance nanofiber air filter medium so structured has a high volatile organic compound (VOC) adsorption performance, a high powder dust filtration efficiency, a low pressure loss, and an antimicrobial property.

2. The high-adsorption-performance nanofiber air filter medium according to claim 1, wherein the support material comprises nonwoven fabric or paper, and has a basic weight in the range of 10-30 g/m$^2$.

3. The high-adsorption-performance nanofiber air filter medium according to claim 2, wherein the nonwoven fabric includes one of melt-blown nonwoven fabric, spunbonded nonwoven fabric, hot-air-bonded nonwoven fabric, and air-laid nonwoven fabric.

4. The high-adsorption-performance nanofiber air filter medium according to claim 1, wherein the first nano-powder composite nanofiber has an average fiber fineness between 40 nm-90 nm and comprises a first water-soluble polymer and a nano-metal oxide, wherein the nano-metal oxide comprises $TiO_2$, ZnO, or a mixture thereof, a ratio of the nano-metal oxide contained in the first nano-powder composite nanofiber being 0.5-5%.

5. The high-adsorption-performance nanofiber air filter medium according to claim 4, wherein the first water-soluble polymer comprises nylon, polyethylene oxide, polyvinyl alcohol, or a mixture thereof.

6. The high-adsorption-performance nanofiber air filter medium according to claim 1, wherein the second nano-powder composite nanofiber has an average fiber fineness between 10 nm-60 nm and comprises a second water-soluble polymer and a nano-absorbent, wherein the nano-absorbent comprises activated carbon, zeolite, apatite, or a mixture thereof, a ratio of the nano-absorbent with respect to the second nano-powder composite nanofiber being 0.5-5%.

7. The high-adsorption-performance nanofiber air filter medium according to claim 6, wherein the second water-soluble polymer comprises chitin, chitosan, a chitosan derivative, or a mixture thereof.

8. The high-adsorption-performance nanofiber air filter medium according to claim 1, wherein the third nano-powder composite nanofiber has an average fiber fineness between 40 nm-90 nm and comprises a third water-soluble polymer, a nano-catalyst, and a nano-absorbent, the nano-absorbent comprising activated carbon, zeolite, apatite, or a mixture thereof, the nano-catalyst comprising ZnO, $MnO_2$, or a mixture thereof, a ratio of the nano-catalyst and the nano-absorbent with respect to the third nano-powder composite nanofiber being 0.5-5%, a ratio of the nano-catalyst with respect to the nano-catalyst and the nano-absorbent being between about 10% and about 50%.

9. The high-adsorption-performance nanofiber air filter medium according to claim 8, wherein the third water-soluble polymer comprises nylon, polyethylene oxide, polyvinyl alcohol, or a mixture thereof.

10. The high-adsorption-performance nanofiber air filter medium according to claim 1, wherein the multiple layers comprise 3-12 layers.

11. The high-adsorption-performance nanofiber air filter medium according to claim 1, wherein the composite nanofiber filtration layer has a basic weight of 0.1-1.5 g/m$^2$.

12. The high-adsorption-performance nanofiber air filter medium according to claim 1, wherein the nanometer composite nanofiber layer comprises 20-50% of the first nano-powder composite nanofiber, 10-30% of the second nano-powder composite nanofiber, and 20-50% of the third nano-powder composite nanofiber.

13. A preparation method of high-adsorption-performance nanofiber air filter medium, comprising:
   depositing and stacking multiple layers of nanometer composite nanofiber layer on a surface of a support material to form a composite nanofiber filtration layer, wherein each of the multiple nanometer composite nanofiber layers comprises first nano-powder composite nanofiber, second nano-powder composite nanofiber, and third nano-powder composite nanofiber that are uniformly mixed together with airflow or that are sequentially laminated to form the nanometer composite nanofiber layer, the high-adsorption-performance nanofiber air filter medium has a high volatile organic compound (VOC) adsorption performance, a high powder dust filtration efficiency, a low pressure loss, and an antimicrobial property.

14. The preparation method of high-adsorption-performance nanofiber air filter medium according to claim 13, wherein the first nano-powder composite nanofiber is formed with high-voltage electrostatic field spinning in combination with airflow stretching spinning; the second nano-powder composite nanofiber is formed with high-voltage electrostatic field spinning; and the third nano-powder composite nanofiber is formed with high-voltage electrostatic field spinning in combination with airflow stretching spinning.

15. The preparation method of high-adsorption-performance nanofiber air filter medium according to claim 13, wherein the sequential lamination comprises a first nanofiber layer, a second nanofiber layer, and a third nanofiber layer,
   wherein the first nanofiber layer is stacked on the surface of the support material and the first nanofiber layer comprises multiple first nano-powder composite nanofibers;
   the second nanofiber layer is stacked on a surface of the first nanofiber layer, and the second nanofiber layer comprises multiple second nano-powder composite nanofibers; and
   the third nanofiber layer is stacked on a surface of the second nanofiber layer, and the third nanofiber layer comprises multiple third nano-powder composite nanofibers.

16. The preparation method of high-adsorption-performance nanofiber air filter medium according to claim 13, wherein the multiple layers comprise 3-12 layers.

17. The preparation method of high-adsorption-performance nanofiber air filter medium according to claim 13, wherein the composite nanofiber filtration layer has a basic weight of 0.1-1.5 g/m$^2$.

18. The preparation method of high-adsorption-performance nanofiber air filter medium according to claim 13, wherein the nanometer composite nanofiber layer comprises 20-50% of the first nano-powder composite nanofiber, 10-30% of the second nano-powder composite nanofiber, and 20-50% of the third nano-powder composite nanofiber.

\* \* \* \* \*